United States Patent
Gomes et al.

(10) Patent No.: US 12,320,462 B2
(45) Date of Patent: Jun. 3, 2025

(54) CORE MATERIAL FOR VACUUM INSULATION STRUCTURES INCLUDING POROUS WALLED HOLLOW GLASS MICROSPHERES

(71) Applicant: WHIRLPOOL CORPORATION, Benton Harbor, MI (US)

(72) Inventors: Alberto R. Gomes, St. Joseph, MI (US); Jose Guizoni, Jr., St. Joseph, MI (US); Devidas Balu Raskar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 566 days.

(21) Appl. No.: 17/538,132

(22) Filed: Nov. 30, 2021

(65) Prior Publication Data

US 2023/0167937 A1    Jun. 1, 2023

(51) Int. Cl.
*F16L 59/065* (2006.01)
*F16L 59/02* (2006.01)
*F25D 23/06* (2006.01)

(52) U.S. Cl.
CPC ............ *F16L 59/065* (2013.01); *F16L 59/02* (2013.01); *F25D 23/06* (2013.01); *F25D 2201/14* (2013.01)

(58) Field of Classification Search
None
See application file for complete search history.

(56) References Cited

U.S. PATENT DOCUMENTS

| | | |
|---|---|---|
| 4,637,990 A | 1/1987 | Torobin |
| 7,666,807 B2 | 2/2010 | Heung et al. |
| 8,535,725 B2 | 9/2013 | Li et al. |
| 8,758,715 B2 | 6/2014 | Wicks et al. |
| 8,895,146 B2 | 11/2014 | Mohtadi et al. |
| 10,173,354 B2 | 1/2019 | Mack et al. |
| 10,648,609 B2 | 5/2020 | Ernat et al. |
| 10,661,527 B2 | 5/2020 | Deka et al. |
| 10,710,918 B1 * | 7/2020 | Cooper ................... C03B 11/10 |
| 11,009,288 B2 | 5/2021 | Deka et al. |
| 11,162,630 B2 | 11/2021 | Deka et al. |
| 2010/0139320 A1 | 6/2010 | Schumacher et al. |
| 2012/0051997 A1 | 3/2012 | Wicks et al. |
| 2015/0135774 A1 | 5/2015 | Hojaji et al. |
| 2016/0207817 A1 | 7/2016 | Hojaji et al. |
| 2019/0144343 A1 * | 5/2019 | Deka ....................... C04B 26/02 |
| | | 428/76 |

(Continued)

FOREIGN PATENT DOCUMENTS

| | | |
|---|---|---|
| AU | 2011304551 A1 | 4/2013 |
| WO | 2007011381 A2 | 1/2007 |
| WO | 2012038215 A1 | 3/2012 |

(Continued)

*Primary Examiner* — Ronak C Patel
(74) *Attorney, Agent, or Firm* — Price Heneveld LLP (57) ABSTRACT

An insulation composition for an appliance is disclosed. The insulation composition includes a plurality of porous walled hollow glass microspheres. The porous walled hollow glass microspheres include a wall defining an interior cavity and an outer surface. The wall may further define a plurality of interconnected pores. The pores may be sized in a range of about 10-300 nm (100-3,000 Å) and fluidly couple an exterior space with the interior cavity.

11 Claims, 6 Drawing Sheets

(56) References Cited

U.S. PATENT DOCUMENTS

2021/0018254 A1 1/2021 Nigam et al.
2021/0108852 A1 4/2021 Guizoni, Jr. et al.

FOREIGN PATENT DOCUMENTS

| WO | WO-2014184393 A1 * | 11/2014 | ............. C04B 30/02 |
|----|---------------------|---------|--------------------------|
| WO | 2018063173 A1 | 4/2018 | |
| WO | 2019199266 A1 | 10/2019 | |

* cited by examiner

CORE MATERIAL FOR VACUUM INSULATION STRUCTURES INCLUDING POROUS WALLED HOLLOW GLASS MICROSPHERES

BACKGROUND OF THE DISCLOSURE

The present disclosure generally relates to insulation materials for use in vacuum insulated structures, and more specifically, to insulation materials for use in vacuum insulated structures used in appliances, such as refrigerators and freezers, and methods of forming said insulation materials.

SUMMARY OF THE DISCLOSURE

According to one aspect of the present disclosure, a vacuum insulated structure for a refrigerating appliance, includes an inner liner, an outer wrapper coupled to the inner liner and defining an insulating cavity, and an insulation composition disposed within the insulating cavity. The insulation composition includes a plurality of porous walled hollow glass microspheres. The porous walled hollow glass microspheres include a wall defining an interior and an outer surface. The wall further defines a plurality of interconnected pores, wherein the pores are sized in a range of about 10-300 nm (100-3000 Å).

According to another aspect of the present disclosure, an insulation composition for an appliance, includes a plurality of porous walled hollow glass microspheres. The porous walled hollow glass microspheres include a wall defining an interior cavity and an outer surface. The wall further defines a plurality of interconnected pores. The pores are sized in a range of about 10-300 nm (100-3,000 Å) and fluidly couple an exterior space with the interior cavity.

According to yet another aspect of the present disclosure, a vacuum insulated structure for a refrigerating appliance, includes an inner liner, an outer wrapper coupled to the inner liner and defining an insulating cavity, and an insulation composition disposed substantially throughout the insulating cavity. The insulation composition includes a plurality of porous walled hollow glass microspheres. The porous walled hollow glass microspheres include a wall defining an interior cavity and an outer surface. The wall further defines a plurality of channels, wherein the channels are sized in a range of approximately 10-300 nm (100-3,000 Å) and fluidly couple an exterior space with the interior cavity.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to an insulation material. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
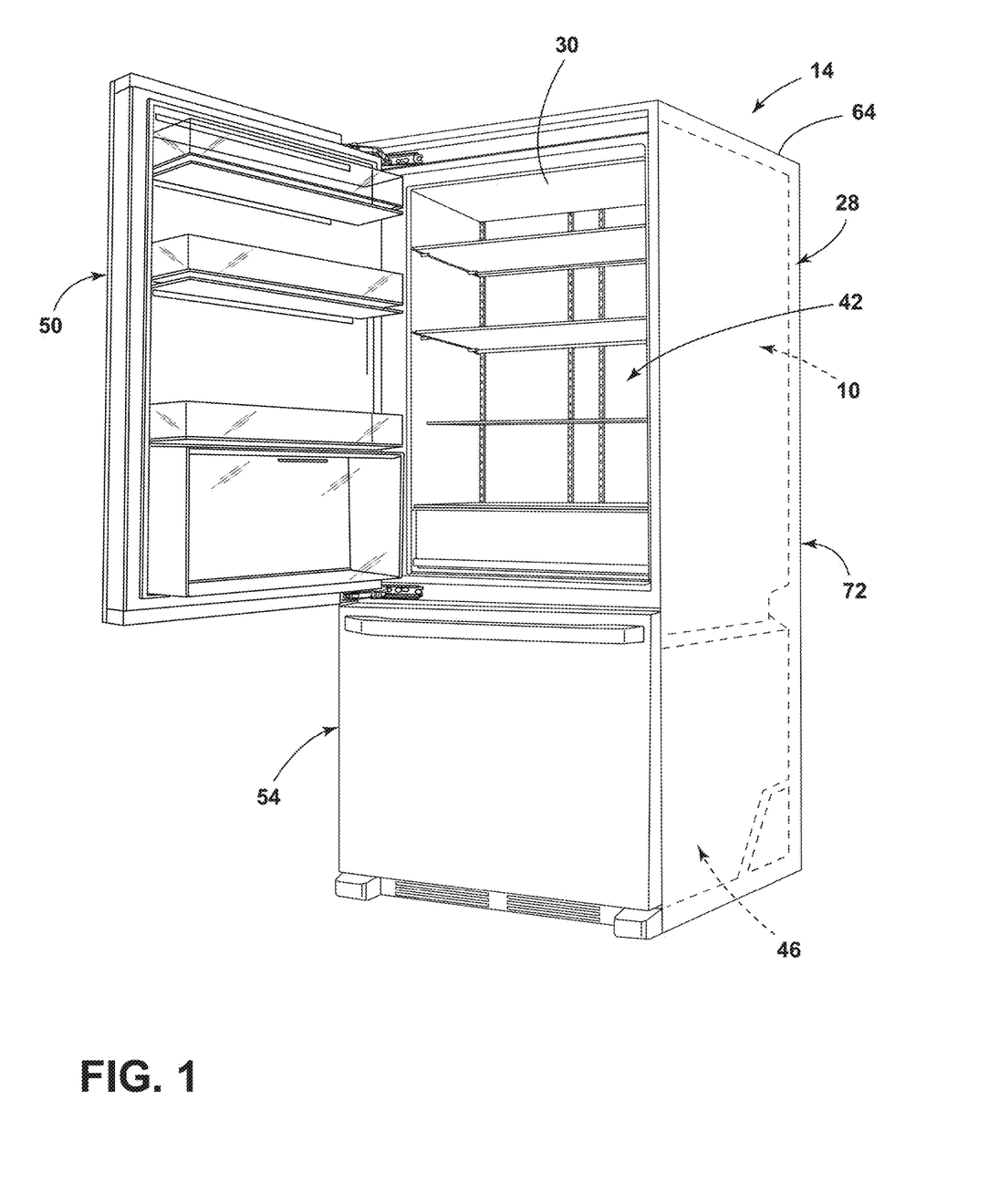
FIG. 1 is a front perspective view of an appliance including a vacuum insulated structure, according to the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-4, aspects of the present disclosure relate to an insulation composition 10 for an appliance 14. The insulation composition 10 includes a plurality of porous walled hollow glass microspheres 18. The porous walled hollow glass microspheres 18 include a wall 22 defining an interior cavity 26 and an outer surface 30. The wall 22 further defines a plurality of interconnected pores 34. The pores 34 are sized in a range of about 10-300 nm (100-3,000 Å) and fluidly couple an exterior space E with the interior cavity 26.

Figure 2:
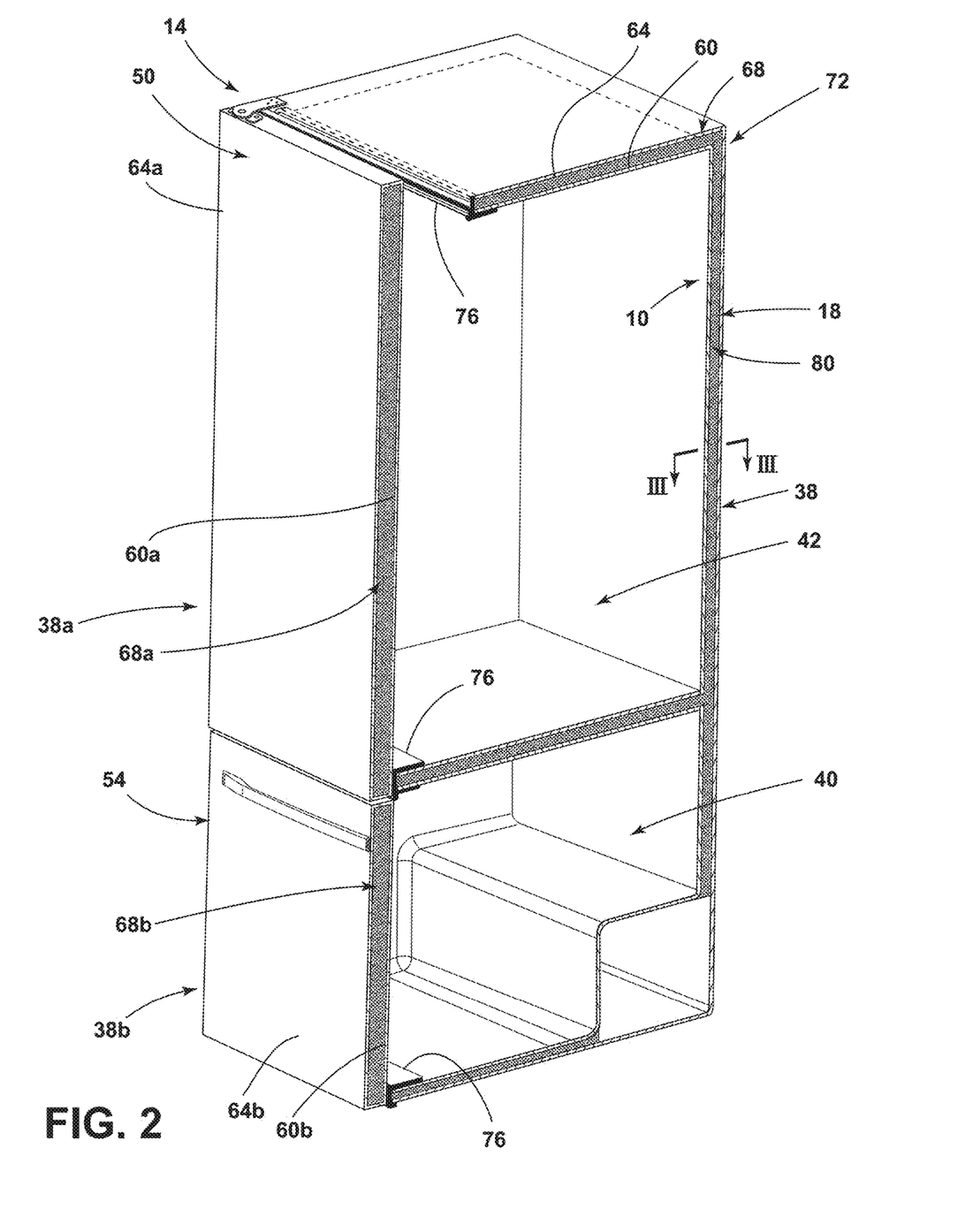
FIG. 2 is a side perspective cross-sectional view of the appliance of FIG. 1, according to the present disclosure.

Referring to FIGS. 1-2, reference numeral 38 generally refers to a vacuum insulated structure for the appliance 14. The vacuum insulated structure 38 of the present disclosure may be in the form of a vacuum insulated structural cabinet, as illustrated, or a vacuum insulated panel that may be used as an insulation member for the appliance 14. The appliance 14 can be in the form of a refrigerating appliance having a refrigeration compartment 42 and a freezer compartment 46, as illustrated. The appliance 14 can include first and second insulated door assemblies 50 and 54 for selectively providing access to the refrigeration compartment 42 and the freezer compartment 46, respectively. The first and second insulated door assemblies 50 and 54 can be configured to rotate and/or slide between an open and closed position with respect to the appliance 14 to allow for selective access to the refrigeration compartment 42 and the freezer compartment 46, respectively.

The appliance 14 can have additional components based on the type of appliance, the details of which are not germane to the aspects of the disclosure, examples of which include a controller, user interface, lights, a compressor, a condenser, an evaporator, an ice maker, a water dispenser, etc. The appliance 14 can also be in the form of a refrigerating appliance including only a refrigeration compartment, only a freezer compartment, or any various combinations and configurations thereof. For example, in non-limiting examples, the refrigerating appliance can be a bottom mount refrigerator, a bottom mount French door refrigerator, a top mount refrigerator, a side-by-side refrigerator, a four-door French door refrigerator, and/or a five door French door refrigerator. While the vacuum insulated structure 38 is described in the context of a refrigerating appliance, it is understood that the vacuum insulated structure 38 can be used in a variety of appliances, examples of which include ovens, dishwashers, water heaters, laundry appliances, and any other appliances that may benefit from thermal and/or sound insulation.

The vacuum insulated structure 38 can include an inner liner 60 coupled with an outer wrapper 64 to define an insulating cavity 68 of a cabinet body 72 of the appliance 14. In some embodiments, a trim breaker 76 can be provided for coupling the inner liner 60 with the outer wrapper 64, as illustrated. The inner liner 60, outer wrapper 64, and optional trim breaker 76, can be considered a structural wrapper that defines the insulating cavity 68. The insulation composition 10, or core material, is disposed in the insulating cavity 68.

In some aspects, the first and/or second insulated door assemblies 50 and 54 can include a vacuum insulated structure 38a and 38b, respectively, that includes the insulation composition 10 as described with respect to the vacuum insulated structure 38. The structure and/or materials of the inner liner and outer wrapper components of the first and second insulated door assemblies 50 and 54 defining the insulating cavity within which the insulation composition 10 can be housed may be different than those of the body of the appliance 14, and thus are labeled with the suffix "a" and "b." The first insulated door assembly 50 can include a first door inner liner 60a and a first door outer wrapper 64a, which together define a first door insulating cavity 68a. The second insulated door assembly 54 can include a second door inner liner 60b and a second door outer wrapper 64b, which together define a second door insulating cavity 68b. The insulation composition 10 may be present in one or both of the first and second door insulating cavities 68a, 68b. In some aspects, the insulation composition 10 may be the same in the insulating cavity 68 and the first and second door insulating cavities 68a, 68b. In other aspects, at least one of the insulating cavity 68, the first door insulating cavity 68a, and the second door insulating cavity 68b may have a different insulation composition 10 and/or different insulation material than the other of the insulating cavity 68, the first door insulating cavity 68a, and the second door insulating cavity 68b.

The inner liner 60, outer wrapper 64, optional trim breaker 76, first and second door inner liners 60a, 60b, and first and second door outer wrappers 64a, 64b, can be made from any suitable metal, metal-alloy, and/or polymeric material, and may be the same or different. The inner liner 60, outer wrapper 64, and optional trim breaker 76 can be made from materials suitable for maintaining a vacuum within the insulating cavity 68 (i.e., maintain a predetermined lower pressure within the insulating cavity 68, relative to ambient pressure). Likewise, when the first and second insulated door assemblies 50, 54 include the vacuum insulated structure 38a, 38b, the first and second door inner liners 60a, 60b, and first and second door outer wrappers 64a, 64b can be made from materials suitable for maintaining a vacuum within the respective first and second door insulating cavities 68a, 68b.

While aspects of the insulation composition 10 are described with respect to the vacuum insulated structure 38 used to form the cabinet body 72 of the appliance 14, it will be understood that aspects of the insulation composition 10 can be used with one or both of the vacuum insulated structures 38a, 38b of the first and second insulated door assemblies 50, 54, respectively.

Figure 3:
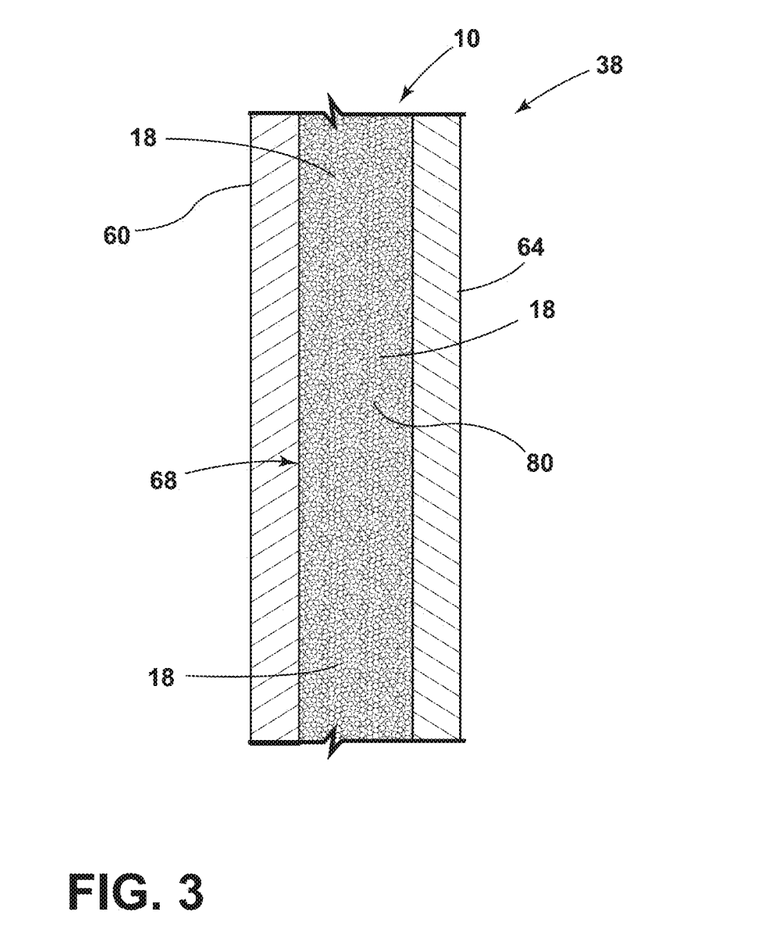
FIG. 3 is a side perspective cross-sectional view of a portion of the appliance of FIG. 2 taken along the line III-III, according to the present disclosure.
Figure 4:
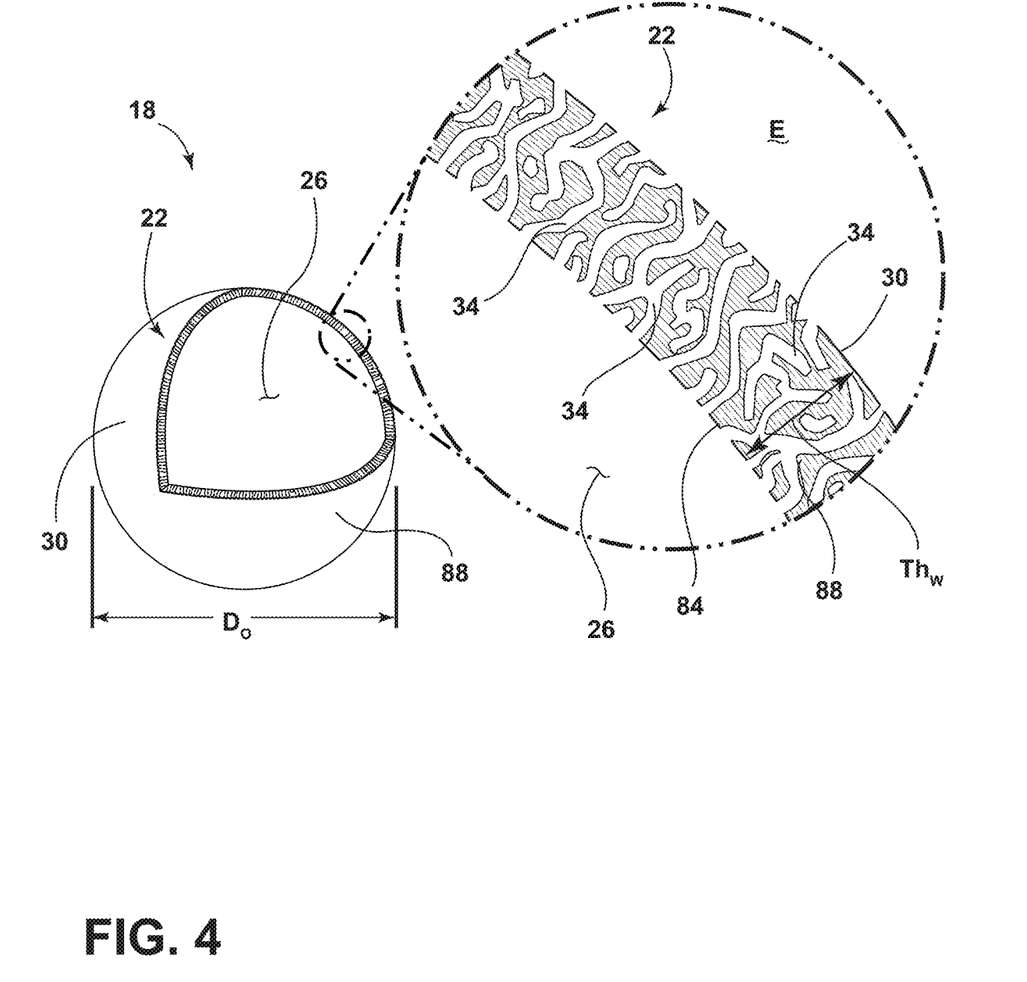
FIG. 4 is perspective view of a porous walled hollow glass microsphere with a portion of the microsphere removed and a wall of the microsphere magnified, according to the present disclosure.

Referring now to FIGS. 3 and 4, the insulation composition 10 includes the plurality of porous walled hollow glass microspheres 18. The insulation composition 10 may further include one or more additives 80 intermixed with the porous walled hollow glass microspheres 18. In some examples, the insulation composition 10 includes approximately 70-90 wt. % of the porous walled hollow glass microspheres 18 and approximately 10-30 wt. % of one or more additives 80, but is not limited to such ratios. For example, the insulation composition 10 may include approximately 90-100 wt. % of the porous walled hollow glass microspheres 18 and approximately 0-10 wt. % of one or more additives 80. Non-limiting examples of additives 80 include opacifiers, colorants, electrical conductivity additives, radiant energy reflectivity additives, infrared absorbing additives, etc. The insulation composition 10 may be tightly packed within the insulating cavity 68 such that that various porous walled hollow glass microspheres 18 of the plurality of porous walled hollow glass microspheres 18 are in direct physical contact with at least one other adjacent porous walled hollow glass microsphere 18.

Referring to FIG. 4, the porous walled hollow glass microspheres 18 include the wall 22 defining the interior cavity 26, or interior, an inner surface 84 and the outer surface 30. The interior cavity 26 is hollow and may be vacant or include a filler material. The filler material may include opacifiers, such as carbon black, colorants, electrical conductivity additives, radiant energy reflectivity additives, infrared absorbing additives, etc. Further, as the interior cavity 26 may be evacuated, a pressure within the interior of the porous walled hollow glass microspheres 18 may be less than ambient pressure.

The porous walled hollow glass microspheres 18 are generally spherical in shape. An outer diameter, $D_o$, of the porous walled hollow glass microspheres 18 may be in a range of approximately 10-100 μm. In some examples, the outer diameter, $D_o$, of the porous walled hollow glass microspheres 18 may be approximately 50 μm. However, it is within the scope of aspects described herein for the outer diameter, $D_o$, to be greater than 100 μm or less than 10 μm. Additionally, the wall 22 of the porous walled hollow glass microspheres 18 may include a thickness of approximately 1 μm (10,000 Å).

The wall 22 defines a plurality of channels 34, which may be in the form of pores, such that the wall 22 is porous and includes a high-degree of porosity. In some aspects, the channels 34 are interconnected. In this way, various channels 34 of the plurality of channels 34 are in fluid communication with an adjacent channel 34 of the plurality of channels 34. The plurality of channels 34 fluidly couple an exterior space, E, with the interior cavity 26. The channels 34 may be sized in a range of approximately 10-300 nm (100-3,000 Å) as measured by mercury intrusion porosimetry. This high-degree of porosity of the walls 22 permits the interior cavity 26 to be evacuated such that the interior cavity 26 may be at least partially, or completely evacuated. As such, gas conduction of heat may be reduced. Further, the high-degree of porosity of the walls 22 results in a reduction of solid conduction of heat on the walls 22 compared to a hollow glass microsphere (HGM), which does not include walls having pores. Therefore, the high-degree of porosity of the walls 22 significantly reduces thermal conductivity for increased thermal performance of the insulation composition 10.

Still referring to FIG. 4, the wall 22 is made of a glass composition 88 which is resistant to thermal shock. In some aspects, the glass composition 88 is almost entirely $SiO_2$ (silicon dioxide). More specifically, the glass composition 88 may be a borosilicate glass having $SiO_2$ and $B_2O_3$ (boric oxide) as the main glass-forming constituents. The glass composition 88 may be in the form of a mixture further including, but not limited to: $Na_2O$ (sodium oxide), $Li_2O$ (lithium oxide), CaO (calcium oxide), ZnO (zinc oxide), $P_2O_5$ (phosphorus pentoxide) and $Al_2O_3$ (aluminum oxide). For example, the glass composition 88 may include approximately 40-80 wt. % $SiO_2$, approximately 10-40 wt. % $B_2O_3$, approximately 1-10 wt. % $Na_2O$, approximately 0-3 wt. % $Li_2O$, approximately 0-10 wt. % CaO, approximately 0-5 wt. % ZnO, approximately 0-10 wt. % $P_2O_5$, and approximately 0-10 wt. % $Al_2O_3$. The glass composition 88 may include additives other than those previously listed. For example, the glass composition 88 itself may include opacifying properties due to additives, such as transition metal oxides (TMOs), including, but not limited to: oxides of manganese, iron, cobalt, copper, nickel, etc. In other examples, the glass composition 88 can include: colorants, electrical conductivity additives, radiant energy reflectivity additives, infrared absorbing additives, etc.

The insulation composition 10 containing porous walled hollow glass microspheres 18 can be used to address several challenges associated with forming vacuum insulated structures. In some aspects, insulation composition 10 provides sufficient mechanical strength while also having desired thermal performance. Traditional hollow glass microspheres may include sufficient mechanical strength while thermal performance may be reduced due to the solid nature of the walls. The insulation composition 10 can be configured to inhibit or decrease vacuum bow (deformation of the inner liner 60 and outer wrapper 64 during evacuation) as the insulation composition 10 may have a high flowability and high mechanical strength due to the nature of the porous walled hollow glass microspheres 18. Accordingly, insulation composition 10 provides a vacuum insulated structure having a thermal conductivity and mechanical strength suitable for use in a refrigeration appliance, which is configured to inhibit or decrease vacuum bow.

Figure 5:
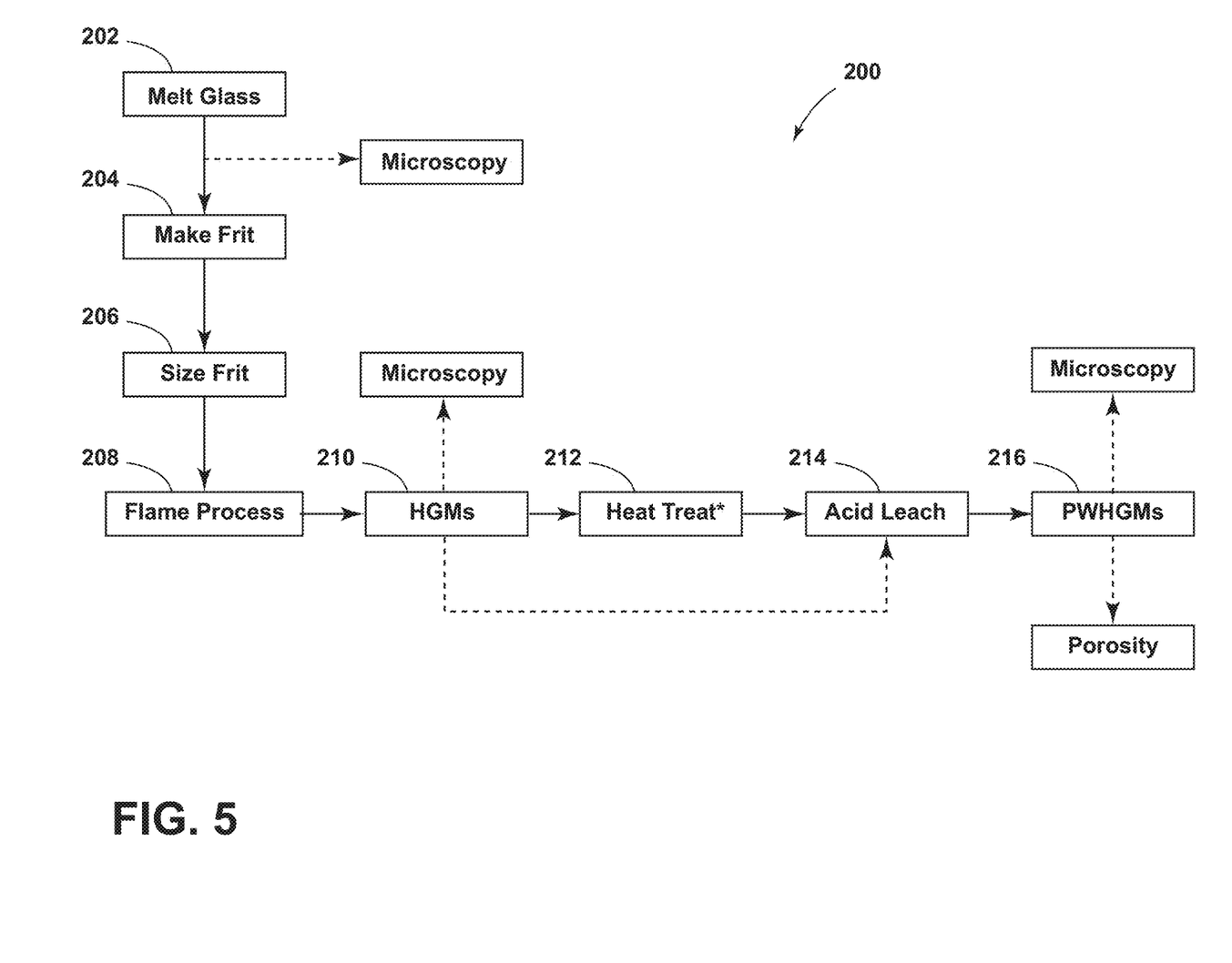
FIG. 5 is flow chart illustrating a method of forming an insulation composition, according to aspects of the present disclosure.

FIG. 5 illustrates a method 200 for forming porous walled hollow glass microspheres 18 according to aspects of the present disclosure. The method 300 can be used to form porous walled hollow glass microspheres 18 for use in the insulation composition 10 of FIGS. 1-3, however it is within the scope of the disclosure for the porous walled hollow glass microspheres 18 to be formed using any suitable method(s).

The method 200 of FIG. 5 includes melting a glass composition, such as the glass composition 88 (in a raw form), or the constituents of the glass composition 88, at step 202, thereby forming a frit material at step 204. Optionally, the method 200 can include a size reduction process to reduce the coarseness of the frit material. At step 206, the frit material is sized such that particles having similar sizes are collected. Step 206 may include a screening technique such that undersized particles are separated out and may be collected for re-use. A series of screening steps can be employed to produce frit particles having a controlled, or desired, size. Once the frit material has been sufficiently sized, a flame process is performed at step 208 to transform the frit particles into a spherical shape. The flame process may consist of spraying the frit material with a blowing agent into a gas-fueled flame. This rapid heating transforms the frit particles into the spherical shape, and, in time, a cavity is formed that can continue to expand during the flame process. This results in the formation of traditional hollow glass microspheres at step 210. Optionally, the method 200 can include a sizing process to separate the hollow glass microspheres by diameter, or size.

In order to convert the hollow glass microspheres into porous walled hollow glass microspheres 18, the method 200 continues at step 212 with a heat treatment procedure. The heat treatment procedure separates the glass composition of the hollow glass microspheres into two glass phases. One glass phase is chemically stable and another glass phase is extractable, such that it may dissolve in acid. At step 214, an acid leach process is executed where the extractable phase is leached from the chemically stable phase, thereby forming pores, or channels. For the acid leach process, any suitable strong mineral acid may be used, including hydrochloric acid (HCl). Step 214 results in the formation of the porous walled hollow glass microspheres at step 216. The method 200 may include one or more microscopy steps at any suitable point during the process to view samples for ensuring quality control.

Figure 6:
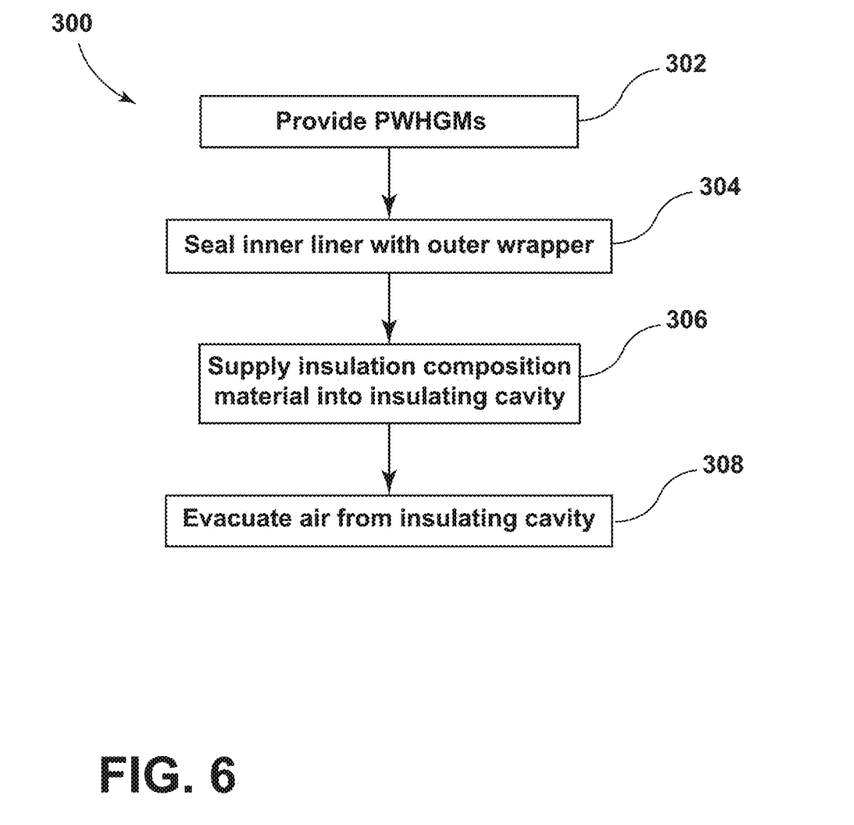
FIG. 6 is a flow chart illustrating a method for forming a vacuum insulated structure containing the insulation composition according to aspects of the present disclosure.

FIG. 6 illustrates a method 300 for forming a vacuum insulated structure 38 containing the insulation composition 10 according to aspects of the present disclosure. The method 300 can be used to form an insulation composition 10 for use in the vacuum insulated structures 38, 38a, and/or 38b of FIGS. 1-2, and any other vacuum insulated structure suitable for use in insulating an appliance.

The method 300 of FIG. 6 includes providing the insulation composition 10 at step 302. The plurality porous walled hollow glass microspheres 18 can be formed according to any suitable process, including, but not limited to, the method 200. The plurality of porous walled hollow glass microspheres 18 can be intermixed with the additives 80, if present, in a desired ratio as previously discussed. The inner liner 60 can be sealed with the outer wrapper 64 at step 304 such that the walls of the inner liner 60 are spaced from the adjacent walls of the outer wrapper 64 to form the insulating cavity 68. The trim breaker 76 can be coupled with the open ends of the inner liner 60 and the outer wrapper 64 to seal the insulating cavity 68. Sealing the inner liner 60, outer wrapper 64, and optional trim breaker 76 can include any suitable combination of welds, adhesives, gaskets, seals, and/or connecting structures.

In other examples, the vacuum insulated structures 38, 38a, and/or 38b can be in the form of individual vacuum insulated panels having an inner liner and an outer wrapper defining an insulating cavity including the insulation composition 10. These vacuum insulated panels can then be inserted within the insulating cavity 68 of the cabinet body 72, first insulated door insulating cavity 68a, and/or second insulated door insulating cavity 68b, respectively.

Next, the insulation composition 10 can be supplied into the sealed insulating cavity 68 through one or more filling ports at step 306. The filled insulating cavity 68 can then be evacuated through one or more evacuation ports at step 308 to create a vacuum chamber within the insulating cavity 68. For example, the insulating cavity 68 can be fluidly coupled with an external vacuum system to draw air from the insulating cavity 68 to obtain a lower pressure within the insulating cavity 68 relative to ambient pressure (i.e., form a vacuum insulated structure). The vacuum insulated structures 38a and 38b used with the first and second insulated door assemblies 50 and 54 can be formed in a similar manner.

The invention disclosed herein is further summarized in the following paragraphs and is further characterized by combinations of any and all of the various aspects described therein.

According to one aspect of the present disclosure, a vacuum insulated structure for a refrigerating appliance includes an inner liner and an outer wrapper coupled to the inner liner and defining an insulating cavity. An insulation composition is disposed within the insulating cavity and the insulation composition includes a plurality of porous walled hollow glass microspheres. The porous walled hollow glass microspheres include a wall defining an interior and an outer surface. The wall further defines a plurality of interconnected pores, wherein the pores are sized in a range of about 10-300 nm (100-3000 Å).

According to another aspect, a pressure inside the insulating cavity is less than ambient pressure.

According to another aspect, a pressure inside the interior of the porous walled hollow glass microspheres is less than ambient pressure.

According to another aspect, the insulation composition includes approximately 70-90 wt. % of the porous walled hollow glass microspheres.

According to another aspect, the insulation composition includes approximately 10-30 wt. % of an additive.

According to another aspect, the porous walled hollow glass microspheres are generally spherical in shape and include an outer diameter in a range of approximately 10-100 μm.

According to another aspect, the plurality of interconnected pores fluidly couple an exterior space with the interior of the porous walled hollow glass microspheres.

According to another aspect, a glass composition of the wall of the porous walled hollow glass microspheres includes $SiO_2$ and at least one of $B_2O_3$ and $Na_2O$.

According to another aspect, the insulation composition is tightly packed within the insulating cavity such that various porous walled hollow glass microspheres of the plurality of porous walled hollow glass microspheres are in direct physical contact with at least one other adjacent porous walled hollow glass microsphere.

According to another aspect of the present disclosure, an insulation composition for an appliance includes a plurality of porous walled hollow glass microspheres. The porous walled hollow glass microspheres include a wall defining an interior cavity and an outer surface. The wall further defines a plurality of interconnected pores. The pores are sized in a range of about 10-300 nm (100-3,000 Å) and fluidly couple an exterior space with the interior cavity.

According to another aspect, the wall of the porous walled hollow glass microspheres includes a thickness of approximately 1 μm (10,000 Å).

According to another aspect, the insulation composition includes approximately 70-90 wt. % of the porous walled hollow glass microspheres.

According to another aspect, the insulation composition includes approximately 10-30 wt. % of an additive.

According to another aspect, the porous walled hollow glass microspheres are generally spherical in shape and include an outer diameter in a range of approximately 10-100 μm.

According to another aspect, a glass composition of the wall of the porous walled hollow glass microspheres includes $SiO_2$ and at least one of $B_2O_3$ and $Na_2O$.

According to yet another aspect of the present disclosure, a vacuum insulated structure for a refrigerating appliance includes an inner liner. An outer wrapper is coupled to the inner liner and defines an insulating cavity. An insulation composition is disposed substantially throughout the insulating cavity. The insulation composition includes a plurality of porous walled hollow glass microspheres. The porous walled hollow glass microspheres include a wall defining an interior cavity and an outer surface. The wall further defines a plurality of channels. The channels are sized in a range of approximately 10-300 nm (100-3,000 Å) and fluidly couple an exterior space with the interior cavity.

According to another aspect, a pressure inside the insulating cavity is less than ambient pressure.

According to another aspect, a pressure inside the interior cavity of the porous walled hollow glass microspheres is less than ambient pressure.

According to another aspect, the wall of the porous walled hollow glass microspheres includes a thickness of approximately 1 μm (10,000 Å).

According to another aspect, the insulation composition includes approximately 70-90 wt. % of the porous walled hollow glass microspheres.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure for a refrigerating appliance, comprising:
    an inner liner;
    an outer wrapper coupled to the inner liner and defining an insulating cavity; and
    an insulation composition disposed within the insulating cavity, the insulation composition comprising a plurality of porous walled hollow glass microspheres, the porous walled hollow glass microspheres wherein the insulation composition comprises approximately 70-90 wt. % of the porous walled hollow glass microspheres, and wherein the insulation composition comprises approximately 10-30 wt. % of an additive, comprising:
        a wall defining an interior and an outer surface, the wall further defining a plurality of interconnected pores, wherein the pores are sized in a range of about 10-300 nm (100-3000 Å).

2. The vacuum insulated structure for a refrigerating appliance of claim 1, wherein a pressure inside the insulating cavity is less than ambient pressure.

3. The vacuum insulated structure for a refrigerating appliance of claim 1, wherein a pressure inside the interior of the porous walled hollow glass microspheres is less than ambient pressure.

4. The vacuum insulated structure for a refrigerating appliance claim 1, wherein the porous walled hollow glass microspheres are generally spherical in shape and include an outer diameter in a range of approximately 10-100 µm.

5. The vacuum insulated structure for a refrigerating appliance of claim 4, wherein the plurality of interconnected pores fluidly couple an exterior space with the interior of the porous walled hollow glass microspheres.

6. The vacuum insulated structure for a refrigerating appliance of claim 1, wherein a glass composition of the wall of the porous walled hollow glass microspheres comprises $SiO_2$ and at least one of $B_2O_3$ and $Na_2O$.

7. The vacuum insulated structure for a refrigerating appliance of claim 1, wherein the insulation composition is tightly packed within the insulating cavity such that various porous walled hollow glass microspheres of the plurality of porous walled hollow glass microspheres are in direct physical contact with at least one other adjacent porous walled hollow glass microsphere.

8. A vacuum insulated structure for a refrigerating appliance, comprising:
    an inner liner;
    an outer wrapper coupled to the inner liner and defining an insulating cavity; and
    an insulation composition disposed substantially throughout the insulating cavity, the insulation composition comprising a plurality of porous walled hollow glass microspheres, the porous walled hollow glass microspheres wherein the insulation composition comprises approximately 70-90 wt. % of the porous walled hollow glass microspheres, and wherein the insulation composition comprises approximately 10-30 wt. % of an additive, comprising:
        a wall defining an interior cavity and an outer surface, the wall further defining a plurality of channels, wherein the channels are sized in a range of approximately 10-300 nm (100-3,000 Å) and fluidly couple an exterior space with the interior cavity.

9. The vacuum insulated structure for a refrigerating appliance of claim 8, wherein a pressure inside the insulating cavity is less than ambient pressure.

10. The vacuum insulated structure for a refrigerating appliance of claim 8, wherein a pressure inside the interior cavity of the porous walled hollow glass microspheres is less than ambient pressure.

11. The vacuum insulated structure for a refrigerating appliance of claim 8, wherein the wall of the porous walled hollow glass microspheres includes a thickness of approximately 1 µm (10,000 Å).

\* \* \* \* \*